United States Patent [19]

Travis et al.

[11] Patent Number: 5,581,641
[45] Date of Patent: Dec. 3, 1996

[54] OPTICAL FIBER MULTIPORT APPARATUS FOR DETECTING PHASE SHIFTS

[75] Inventors: Adrian R. L. Travis, Wrangaton; John E. Carroll, Cambridge, both of England

[73] Assignee: Ceorl Limited, Cambridge, England

[21] Appl. No.: 432,721

[22] Filed: May 2, 1995

Related U.S. Application Data

[63] Continuation of Ser. No. 286,400, Aug. 5, 1994, abandoned, which is a continuation of Ser. No. 50,261, filed as PCT/GB91/01562, Sep. 12, 1991, abandoned.

[30] Foreign Application Priority Data

Sep. 14, 1990 [GB] United Kingdom .................. 9020175

[51] Int. Cl.⁶ ........................................................ G02B 6/00
[52] U.S. Cl. ........................ 385/12; 385/11; 385/15; 385/24; 385/31; 385/42; 385/43; 385/46; 385/89
[58] Field of Search .................. 385/11, 12, 14, 385/15, 24, 30, 38, 42, 43, 44, 45, 46, 88, 89; 250/227.11; 356/345, 349, 350, 351

[56] References Cited

U.S. PATENT DOCUMENTS

| | | | |
|---|---|---|---|
| 4,243,296 | 1/1981 | Aulich et al. | 385/43 X |
| 4,497,643 | 2/1985 | Kowata et al. | 385/43 X |
| 4,536,088 | 8/1985 | Rashleigh et al. | 356/351 |
| 4,609,290 | 9/1986 | Cahill | 356/345 |
| 4,671,113 | 6/1987 | Carome | 73/705 X |
| 4,836,644 | 6/1989 | Eisenmann et al. | 385/43 X |
| 5,121,452 | 6/1992 | Stowe et al. | 385/43 X |
| 5,162,869 | 11/1992 | Michel et al. | 356/345 |
| 5,175,779 | 12/1992 | Mortimore | 385/43 X |
| 5,175,782 | 12/1992 | Bowen et al. | 385/43 X |

FOREIGN PATENT DOCUMENTS

| | | | |
|---|---|---|---|
| 13972 | 8/1980 | European Pat. Off. | 385/43 X |
| 81349 | 6/1983 | European Pat. Off. | 385/43 X |
| 137501 | 4/1985 | European Pat. Off. | 385/43 X |
| 287925 | 10/1988 | European Pat. Off. | 385/43 X |
| 322893 | 7/1989 | European Pat. Off. | 385/11 X |
| 353870 | 2/1990 | European Pat. Off. | 385/43 X |
| 2910637 | 9/1980 | Germany | 385/42 X |
| 1238029 | 7/1971 | United Kingdom | 250/227.11 X |
| 1394743 | 5/1975 | United Kingdom | 362/32 X |
| 2207525 | 2/1989 | United Kingdom | 385/42 X |
| 2220764 | 1/1990 | United Kingdom | 385/43 X |
| 2220765 | 1/1990 | United Kingdom | 385/43 X |
| 2228097 | 8/1990 | United Kingdom | 385/43 X |
| 9011540 | 10/1990 | WIPO | 385/42 X |

OTHER PUBLICATIONS

Davis, et al: "A Phase Insensitive Homodyne Optical Receiver", IEE Colloquium on Advances in Coherent Optic Devices and Technologies, Mar., 1985.
Patent Abstract of Japan, vol. 6, No. 112, (P–124)(990)–Jun. 1982. JP,A,57041602–Mar. 8, 1982 see abstract.

*Primary Examiner*—Brian Healy
*Attorney, Agent, or Firm*—Cushman, Darby & Cushman

[57] ABSTRACT

A coherent detector which is insensitive to signal or polarization state may be assembled using a fused optical fibre multiport constructed from five optical fibres. The fibres are fused in a circularly symmetric arrangement, then tapered until power injected into any input is equally distributed to all outputs. Reference signals are injected into adjacent inputs and the signal to be detected into a signal adjacent one of the reference inputs.

11 Claims, 1 Drawing Sheet

1

OPTICAL FIBER MULTIPORT APPARATUS FOR DETECTING PHASE SHIFTS

This application is a continuation of application Ser. No. 08/286,400, filed Aug. 5, 1994, now abandoned, which was a continuation of application Ser. No. 08/050,261, filed May 6, 1993, now abandoned, which was a §371 filing of international application PCT/GB91/01562, filed Sept. 12, 1991, abandoned.

This invention relates to optical apparatus and, in particular, to optical fibre multiports for use in coherent detection.

BACKGROUND OF THE INVENTION

Coherent detection is used in optical fibre gyroscopes to measure signal phase shift, in long haul optical fibre communication to increase detector sensitivity and in wavelength multiplexed schemes to provide wavelength selective detection. In each of these applications the polarisation state of the signal must be matched to that of the reference <or local oscillator) at the photodetector. However, in conventional monomode optical fibres the polarisation state of the signal can change continuously—in order to realign signal polarisation state one needs polarisation controllers which can be expensive, bulky and unreliable.

Optical fibre multiports can be used to detect the complete envelope of signal phase or in long haul communications to provide "phase diversity"—coherent detection of the signal which is independent of fluctuation is signal phase. Such multiports are difficult to make because they require several fibres to be fused with precise symmetry. A three fibre device has been described by Davis A. W. and Wright S. ("A phase sensitive homodyne optical receiver" IEE Colloquium Digest No 185/30 Paper 11), but while the properties required for a four-fibre device have been Know for some time it is only recently that such a device has been successfully made. Even now the necessary control of the extra fourth mode in the four fibre device is difficult.

It is possible to imagine that a "full diversity", i.e. coherent detection of a signal independent of either its phase or its polarisation state might be provided by arrays of multiports. For example, a polarisation splitter could be used to separate two orthogonally polarised components of a signal into a pair of phase diversity multiports. Alternatively such an array might be used for complete detection of each polarisation state of the signal phase and/or polarisation state. However, such arrays of couplers are bulky and expensive.

SUMMARY OF THE INVENTION

It is proposed here to make a single multiport which provides for coherent detection with full diversity. While the minimum number of outputs required in an array is six (three outputs to detect the phase of each polarisation state of the signal) this multiport need only have five outputs.

According to the present invention there is provided a fibre optic multiport having at least five outputs.

BRIEF DESCRIPTION OF THE DRAWINGS

The invention will now be particlarly described with reference to the accompanying drawings in which.

DETAILED DESCRIPTION OF THE INVENTION

The optical properties required of a full diversity multiport with five outputs are complicated but can be defined for present purposes by imagining a structure which is the four dimensional equivalent of a tetrahedron. If the four dimensions comprise a pair of mutually orthogonal Argand diagrams (one for each polarisation state) then the position vectors of the five corners of the structure represent the required state of the reference at each output.

Figure 1:
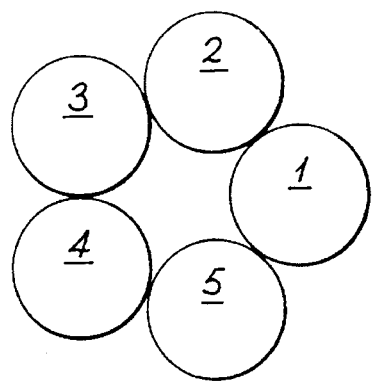
FIG. 1 shows the cross-section of a preform for a symmetrical arrangement of five fibres.

Given such symmetry it might be expected that a symmetrical arrangement of fibres (FIG. 1) would be most likely to make the five output device, particularly since previous three and four fused fibre multiports have had symmetrical fibre arrangements.

Neglecting polarisation state for the present, five correctly fused fibres will support five modes. These are the zero order mode, and horizontal and vertical pairs of the first and second order modes:

$$e^{j\beta_0}\begin{bmatrix}\frac{1}{\sqrt{2}}\\\frac{1}{\sqrt{2}}\\\frac{1}{\sqrt{2}}\\\frac{1}{\sqrt{2}}\\\frac{1}{\sqrt{2}}\end{bmatrix}, e^{j\beta_{1h}}\begin{bmatrix}1\\\cos\frac{2\pi}{5}\\-\cos\frac{\pi}{5}\\-\cos\frac{\pi}{5}\\\cos\frac{2\pi}{5}\end{bmatrix}, e^{j\beta_{1v}}\begin{bmatrix}0\\\sin\frac{2\pi}{5}\\\sin\frac{\pi}{5}\\-\sin\frac{\pi}{5}\\-\sin\frac{2\pi}{5}\end{bmatrix},$$

$$e^{j\beta_{2h}}\begin{bmatrix}1\\-\cos\frac{\pi}{5}\\\cos\frac{2\pi}{5}\\\cos\frac{2\pi}{5}\\-\cos\frac{\pi}{5}\end{bmatrix}, e^{j\beta_{2v}}\begin{bmatrix}0\\\sin\frac{\pi}{5}\\-\sin\frac{2\pi}{5}\\\sin\frac{2\pi}{5}\\-\sin\frac{\pi}{5}\end{bmatrix}$$

Light injected into a single input will excite equal proportions of each mode. The modes will then propagate at various rates down the fused section, but modes of the same order propagate at the same rate: $e^{j\beta_{1h}}=e^{j\beta_{1v}}$ and $e^{j\beta_{2h}}=e^{j\beta_{2v}}$. It follows that there are only two variables of the modal phase: the phases of the first and second order modes relative to the zero order mode. This is rather fortunate because it means that the five fibre device will have no more variables than the four fibre device so should not be more difficult to control during fabrication.

The fraction of the input delivered to each output is determined by summing the phases and amplitudes for each mode at the end of the fused section. The optical properties specified for the device require that equal powers of any sole input be delivered to each output. This will happen if the fibres are fused and tapered until $\beta_1-\beta_0=2\pi/5$ and $\beta_2-\beta_0=-2\pi/5$.

It remains to set up appropriate phase changes between inputs and outputs. It fact it so happens that once a coupler has been made as described above, it will automatically have a suitable set of phase changes provided that it is injected with not one but two references.

Figure 2:
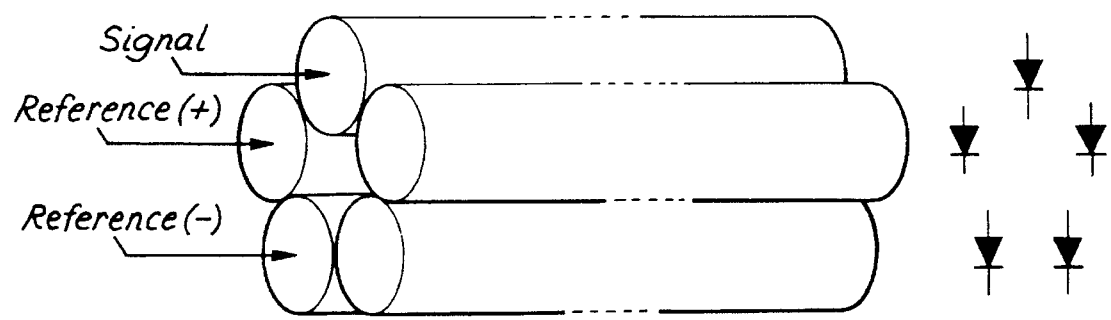
FIG. 2 illustrates the profile of a fused coupler produced from the preform of FIG. 1.

The references must be of equal power but orthogonal polarisation state and are injected into adjacent inputs (FIG. 2). It is assumed that the optical properties of the coupler be equal for both polarisation states. This will be true by arguments of symmetry provided the constituent fibres have zero birefringence. and the polarisation states of both injected references are circular (clockwise and anticlockwise).

For operation of the device, the signal should be injected into one of the inputs adjacent to the pair into which the references are being injected. The detected powers $p_l$ are then the sum of the contributions from each polarisation state, with:

$$p_l \propto S_+^2 + R_+^2 S_+ R_+ \cos(\theta + 2\pi l/5)\ S_-^2 + R_-^2 + 2 S_- R_- \cos(\theta + 4\pi l/5)$$

If the coherently modulated components of the output phase are then squared and summed, the result can be shown to be independent of the signal phase or polarisation state:

$$\sum_{l=1}^{5} \left( p_l - \sum_{l=1}^{5} p_l \right)^2 \propto S_+^2 R_+^2 + S_-^2 R_-^2$$

It might be argued that if this device requires two reference inputs then an extra coupler will be required to split the reference into two and the assembly will effectively become an array. However, the two outputs can at least In principle be derived from any reference laser by coupling light out from both ends of the lasing cavity. An adjustment of polarisation may subsequently be required, but this would be permanent so no moving parts would be needed.

In order to facilitate fabrication of the device a sixth optical fibre of slightly narrower diameter than the other be inserted down the centre of the device. This preserves the symmetry of the preform as it is fused, and may assist coupling between pairs of fibres which are not adjacent.

A coherent detector which is insensitive to signal or polarisation state may be assembled using a fused optical fibre multiport constructed from five optical fibres. To make the multiport the fibres are preferably fused in a circularly symmetric arrangement, then tapered until power injected into any input is equally distributed to all outputs. To operate the coherent detector two references (or local oscillators) of equal power but orthogonal polarisation state are injected into adjacent inputs, and the signal injected into either input adjacent to those used for the references. The sum of the squares of the coherently modulated components of the five output powers is proportional to the product of the signal and the reference power.

We claim:

1. A phase shift detection apparatus comprising:

a fiber optic multiport having inputs adapted to receive signals from a pair of radiation sources of substantially equal power and an orthogonal polarization state, said fiber optic multiport having at least five outputs operably connected with said inputs; and a photodetector for measuring a phase shift of the signals received by said inputs.

2. An assembly comprising:

a pair of radiation sources in the form of opposing ends of a laser cavity;

a fiber optic multiport having inputs adapted to receive signals from a pair of radiation sources of substantially equal power and an orthogonal polarization state, said fiber optic multiport having at least five outputs operably connected with said inputs; and a photodetector for measuring a phase shift of the signals received by said inputs.

3. An assembly as claimed in claim 2, further including means to adjust the polarization of one of said sources.

4. An apparatus as claimed in claim 1, wherein fibers of said fiber optic multiport are tapered so that an optical signal fed to any of said inputs gives rise to substantially equal output signals at each of said outputs.

5. An apparatus as claimed in 4, wherein the response of the coupler is substantially independent of the polarization of the input signals.

6. A fiber optic multiport for use in phase shift detection comprising inputs adapted to receive signals from a pair of radiation sources of substantially equal power and an orthogonal polarization state, and at least five outputs operably connected with said inputs, said outputs adapted to be coupled with a device for detecting a phase shift of said signals.

7. An apparatus as claimed in claim 6, wherein said fibers are tapered so that an optical signal fed to any input gives rise to substantially equal output signals at each output.

8. A coherent detector comprising:

a fiber optic multiport having inputs adapted to receive (i) a reference signal from a first radiation source, (ii) a second reference signal from a second radiation source of substantially equal power to the first source, said second radiation source having an orthogonal polarization state relative to the first radiation source, and (iii) a third signal;

said fiber optic multiport having at least five outputs operably connected with said inputs;

means for detecting the optical power at said outputs; and means for deriving a predetermined characteristic of said third signal based upon the optical power at said outputs.

9. A coherent detector according to claim 8, wherein said deriving means derives a quantity relating to the power of said third signal as said predetermined characteristic based upon the optical power at said outputs.

10. A coherent detector according to claim 8, wherein said deriving means derives a quantity relating to the phase of said third signal as said predetermined characteristic based upon the optical power at said outputs.

11. A coherent detector according to claim 8, wherein said deriving means derives a quantity relating to the polarization of said third signal as said predetermined characteristic based upon the optical power at said outputs.

* * * * *